(12) United States Patent
Walters et al.

(10) Patent No.: US 12,265,637 B2
(45) Date of Patent: Apr. 1, 2025

(54) IDENTIFICATION OF SENSITIVE CONTENT IN ELECTRONIC MAIL MESSAGES TO PREVENT EXFILTRATION

(71) Applicant: Capital One Services, LLC, McLean, VA (US)

(72) Inventors: Austin Grant Walters, Savoy, IL (US); Jeremy Edward Goodsitt, Champaign, IL (US); Anh Truong, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 303 days.

(21) Appl. No.: 17/563,337

(22) Filed: Dec. 28, 2021

(65) Prior Publication Data

US 2023/0205906 A1    Jun. 29, 2023

(51) Int. Cl.
*G06F 21/62* (2013.01)
*H04L 9/40* (2022.01)

(52) U.S. Cl.
CPC ...... *G06F 21/6218* (2013.01); *H04L 63/0245* (2013.01)

(58) Field of Classification Search
None
See application file for complete search history.

(56) References Cited

U.S. PATENT DOCUMENTS

| | | | |
|---|---|---|---|
| 9,716,599 B1 * | 7/2017 | Gates | H04L 51/00 |
| 10,880,322 B1 * | 12/2020 | Jakobsson | H04L 51/08 |
| 2006/0075228 A1 * | 4/2006 | Black | H04L 63/104 |
| | | | 713/167 |
| 2018/0293400 A1 * | 10/2018 | Borup | G06F 21/554 |
| 2022/0215948 A1 * | 7/2022 | Bardot | G16H 40/67 |

FOREIGN PATENT DOCUMENTS

| | | | | |
|---|---|---|---|---|
| CN | 107423851 A | * | 12/2017 | |
| WO | WO-0239331 A2 | * | 5/2002 | ........... G06F 21/606 |

* cited by examiner

*Primary Examiner* — Benjamin E Lanier
(74) *Attorney, Agent, or Firm* — KDW Firm PLLC (57) ABSTRACT

The exemplary embodiments provide an improved approach to preventing exfiltration through email messages. The exemplary embodiments process outbound email messages to determine whether an outbound email message contains sensitive subject matter based on contextual information. The determination may be made based at least in part on the context reflected in the contextual information. In the exemplary embodiments, the determination of whether an outbound email message contains sensitive subject matter that should not be exfiltrated may be based at least in part on analysis performed by a trained neural network model.

19 Claims, 9 Drawing Sheets

IDENTIFICATION OF SENSITIVE CONTENT IN ELECTRONIC MAIL MESSAGES TO PREVENT EXFILTRATION

BACKGROUND

Exfiltration of sensitive information using electronic mail (email) messages has become an increasingly prevalent problem for corporations and other organizations. Many of the existing efforts to reduce exfiltration are not especially effective. Most of these efforts are rules-based systems that apply rules to determine if an outbound email message contains sensitive subject matter. The rules may apply regular expressions that look for specific sequences of characters in the outbound email message. Such rules using regular expressions, however, are easily circumvented by clever adversaries.

Consider the case where a rule using a regular expression is defined to look for the string "password". One way to circumvent such a regular expression is include "p*a*s*s*w*o*r*d*" or some equivalent string that avoids detection when a rule using the regular expression for "password" is used.

SUMMARY

In accordance with an inventive aspect, a method is performed by a processor of a computing device. The method includes, with the one or more computing resources, scanning an outbound electronic mail message for patterns associated with sensitive content. The method also includes further processing the outbound electronic mail message with a trained neural network model running on the processor to yield a probability that the outbound electronic mail message contains sensitive content based on contextual information relating to the outbound electronic mail message. Where the probability that the outbound electronic mail message contains sensitive content exceeds a first threshold, the method takes a first remedial action regarding the outbound electronic mail message.

The method may further include training the neural network model running on the one or more computing resources on a training set of electronic mail messages to identify probabilities that the electronic mail messages contain sensitive content based on contextual information in the training set without searching for the sensitive content in the electronic mail messages. The training set may include electronic mail messages that were sent before an exfiltration event. The training set may include electronic mail messages with the sensitive content removed. The training set may include metadata regarding at least some of the electronic mail messages in the training set, and the metadata regarding the outbound electronic mail message may be processed to yield the probability that the outbound electronic mail message contains sensitive content. The first remedial action may be one of blocking the sending of the outbound electronic mail message, delaying the sending of the outbound electronic mail message for review, triggering an alarm or removing the sensitive content from the outbound electronic mail message. Where the probability that the outbound electronic mail message contains sensitive content exceeds a second threshold that is larger than the first threshold, a second remedial action regarding the outbound electronic mail message may be taken rather than the first remedial action. The method may use a Markov model in conjunction with the neural network model to determine if the outbound electronic mail message contains sensitive content.

In accordance with another inventive aspect, a method is performed by a processor on a computing device. Per the method, an outbound electronic mail message is received by an electronic mail management system. In the method, the outbound electronic mail message is processed with the processor by scanning the outbound electronic mail message for patterns associated with sensitive content. The outbound electronic mail message is further processed with a neural network model running on the processor to determine if the outbound electronic mail message contains sensitive content. Where it is determined that the outbound electronic mail message contains sensitive content, remedial action on the outbound electronic mail message is taken. Where it is determined that the outbound electronic mail message does not contain sensitive content, the outbound electronic mail message is forwarded towards its destination. Processor-executable instructions for performing the method on a processor may be stored on a non-transitory computer-readable storage medium.

The further processing of the outbound electronic mail message with a neural network model running on the processor to determine if the outbound electronic mail message contains sensitive content may include examining context associated with the outbound electronic mail message to determine whether the outbound electronic mail message contains sensitive content. The remedial action may be blocking the sending of the outbound electronic mail message, delaying the sending of the outbound electronic mail message for review, triggering an alarm or removing the sensitive content from the outbound electronic mail message. The method may include using a Markov model in conjunction with the neural network model in the determination of whether the outbound electronic mail message contains sensitive content. What action is taken as the remedial action may be based upon a probability that the outbound electronic mail message contains sensitive content. If the probability that the outbound electronic mail message contains sensitive content is above a first threshold, a first action may be taken as the remedial action but if the probability that the outbound electronic mail message contains sensitive content is above a second threshold a second action may be taken as the remedial action. The processing of the outbound electronic mail message with a neural network model to determine if the outbound electronic mail message contains sensitive content may include processing metadata regarding the outbound electronic mail message. A non-transitory computer-readable storage medium may store instructions for execution on a processor for performing this method.

DETAILED DESCRIPTION

The exemplary embodiments described herein provide an improved approach to preventing exfiltration through email messages. The exemplary embodiments may process outbound email messages to determine whether an outbound email message contains sensitive subject matter based on context. The context refers to one or more aspects of contextual information, such as time of a message, location of the sender, the identity of the sender, the identity of addressed recipient, whether the sending of the message is unusual relative to normal patterns, content of messages that precede the sending of the message and content of messages that follow the sending of the message. In the exemplary embodiments, the determination of whether an outbound email message contains sensitive subject matter that should not be exfiltrated may be based, at least in part, on analysis performed by a trained neural network model. The neural network model may output a probability that the outbound email message contains sensitive subject matter. The probability may be used in reaching a conclusion whether the outbound email message contains sensitive subject matter or not. For example, if the probability that the outbound email message contains sensitive subject matter is greater than 0.5, a conclusion may be made that the outbound email message contains sensitive subject matter. Otherwise, the conclusion may be made that the outbound email message does not contain sensitive subject matter. In some exemplary embodiments, the neural network processing may be used along with processing by scanning for patterns associated with sensitive content, such as through the use of regular expressions.

The exemplary embodiments may take remedial action relating to outbound email messages, such as blocking the outbound email message, delaying the outbound email message for further review by a human or by a computer program, removing sensitive content from the email message and/or sounding an alarm. The remedial action need not be a single one of the above-listed actions but instead may be a combination of the actions. In some exemplary embodiments, the remedial action taken is based, at least in part, on the magnitude of probability from the neural network model. For instance, for probabilities greater than equal to 0.8, the remedial action may be to block the outbound email message, whereas for probabilities between 0.6 to 0.8, the remedial action may cause a notification to be generated and sent, such as to a network administrator. The notification may take different forms, such as the sending or an email or message, or a notice appearing on the display of the computer system of the network administrator. The notification may constitute an alarm seeking to prompt action.

In some exemplary embodiments, a Markov model may be used in conjunction with the neural network model. The Markov model may, for instance, dictate the response to probabilities provided by the neural network. As an example, the Markov model may dictate what happens when the probability is above 0.8 and what happens when the probability is above 0.5 but less than 0.8. The Markov model may also dictate that other criteria than the probability value being over a threshold be satisfied before taking action. For instance, suppose that the neural network issues a probability that a series of emails are likely being exfiltrated. Before issuing an alarm or taking other action, the Markov model may require other events, such as database dumps to a computer.

Figure 1:
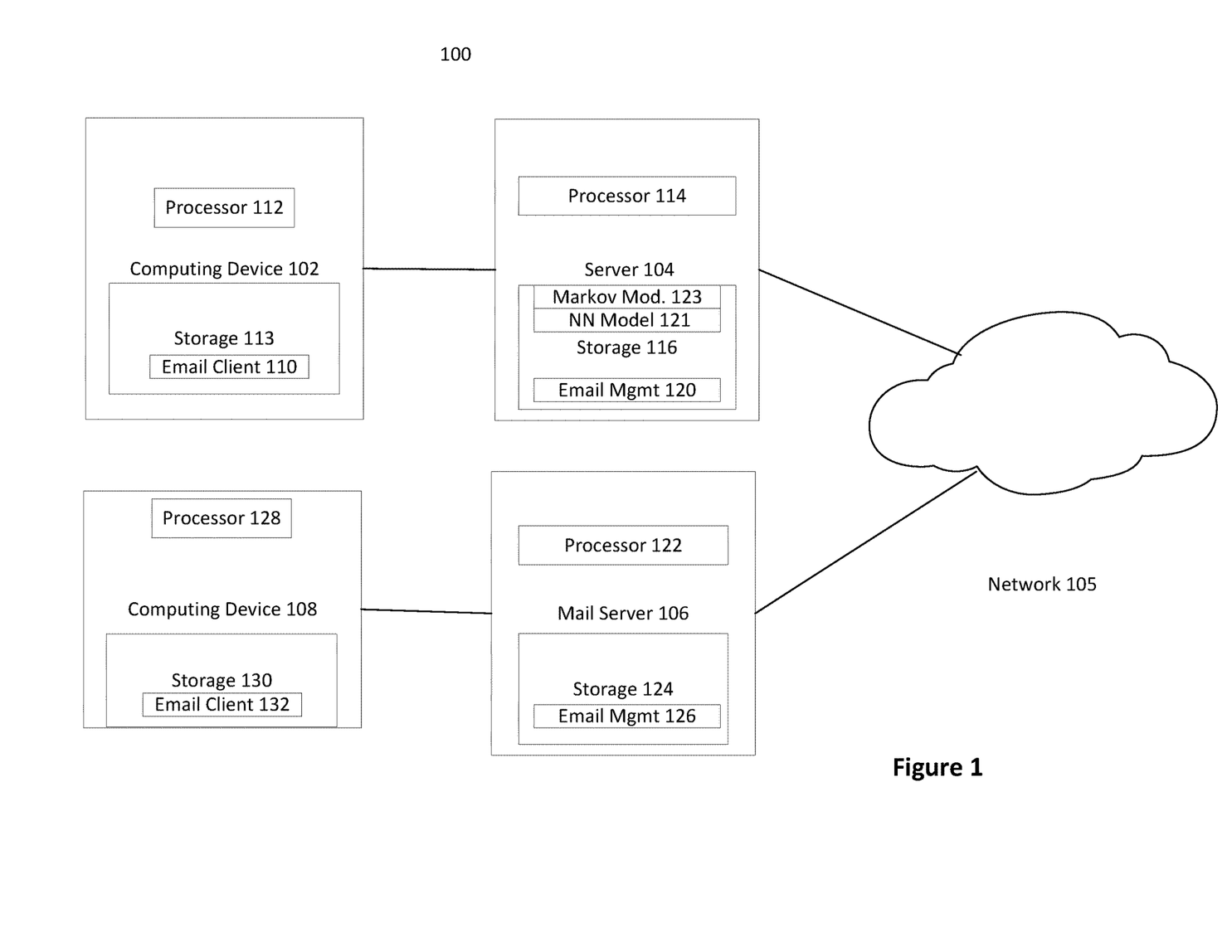
FIG. 1 depicts an illustrative computing environment suitable for practicing illustrative embodiments.

FIG. 1 depicts an exemplary computing environment 100 for practicing exemplary embodiments. In this computing environment, a user uses a computing device 102. The computing device 102 contains a processor 112 and a storage 113. The storage 113 may include an email client 110 that runs on the processor 112. The user may generate email messages, send email messages and receive email messages with the email client 110. The sent and received email messages pass through a server 104. The server 104 may be a computing device, such as a server computer or other variety of computing device. The server 104 may act as a mail server or a proxy server or may implement a firewall. The server 104 includes a processor 114 and a storage 116. The storage 116 may hold email management software 120 for managing email for an organization, such as a corporation. The storage 116 also may include a neural network (NN) model 121. The neural network model 123 learns patterns in outbound email messages and metadata and uses these learned patterns to identify outbound email messages that contain sensitive subject matter as will be described below.

The neural network model may be for a convolutional neural network. With a convolutional neural network there is at least one layer of nodes that perform convolution operations. The node only processes data for its receptive field. The convolution layer generates a feature map that is passed to the next layer of the neural network model 123.

The neural network model 123 may instead be a recurrent neural network model. In a recurrent neural network model, connections between nodes form a directed graph along a temporal sequence. This allows the neural network model to exhibit temporal dynamic behavior. Recurrent neural networks may have a memory and can use their internal state (in memory) to process variable length sequences of inputs. Thus, one input sample can impact the processing of other input samples.

The neural network model 123 employs nodes as basic units of computation. Each node receives inputs from other nodes or from an external source and computes an output. Each input is weighted to indicate the relative importance of the input to the other inputs. The weights applied to the inputs are learnable and control the strength of influence. The inputs are summed at the node, and if the sum exceeds a threshold, the node may fire to generate an output. An activation function determines when the node fires. The activation function may be, for example, a sigmoid function that produces a value between 0 and 1. Another alternative is a tan h function that produces values in the range between −1 and +1.

The neural network model 123 may include several layers. These layers include an input layer of input nodes that pass inputs on to the next layer in the neural network model 123. The layers may include a hidden layer that performs computation using the inputs from the input layer. Outputs from nodes of the hidden layer may be passed to another hidden layer or to an output layer. The output layer has nodes that produce outputs, such as probabilities. The neural network model 123 includes a learning rule which modifies the weights and thresholds of the neural network model 123 in order for the inputs to produce a favored output. An example of a learning rule is a delta rule. The delta rule compares how far an output answer from the neural network model is from the actual answer and makes adjustments to the connection weights to decrease the error. The delta rule relies upon backwards error propagation of weight adjustments. The backwards propagation performs a gradient descent toward a global minimum in the solution space.

An optional Markov model 123 also may be stored in the storage 116. The Markov model 123 may be used in conjunction with the neural network model 121 to identify outbound email messages that likely contain sensitive subject matter and to generate responses, such as discussed above. The Markov model may be implemented as a state diagram having states and transitions between states. The transitions may be based on things such as probability values, metadata values, or the like. The email management system 120 may take remedial actions with respect to outbound email messages that are determined as containing or likely containing sensitive content, such as trade secret information, intellectual property, confidential information or other information deemed to be sensitive, like corporate plans, discussions or the like.

The exemplary computing environment may contain one or more networks 105, including the Internet, for connecting computing resources and parties. At a recipient side, there is a mail server 106, with a processor 122, a storage 124 that continues computer programming instructions for an email management system 126. A computing device 108 is connected to the mail server 106. The computing device 108 contains a processor 108 and a storage 130. An email client 132 is stored in the storage 130 and run on the processor 108.

The processors 113, 114, 122 and 128 may be microprocessors, such as a Central Processing Unit (CPU) or a Graphics Processing Unit (GPU), an Application Specific Integrated Circuit (ASIC), a Field Gate Programmable Array (FPGA) or processing logic. Each processor 113, 114, 122 and 128 may contain multiple cores.

The storages 113, 116, 124 and 130 may contain both primary memory and secondary memory. The storages 113, 116, 124 and 130 may contain Random Access Memory (RAM), Read Only Memory (ROM), solid state memory, including flash memory, optical disk storage, magnetic disk storage, magnetic tape storage and other types of non-transitory processor-readable storage for storing computer programming instructions and/or data.

In the example arrangement of FIG. 1, a user of computing device 102 may use the email client 110 to generate an outbound email message and send the outbound email message to another party on computing device 108. The email client 110 may be implemented in computer programming instructions. The outbound email message is received by a mail server 104, where the email management system 120 may process the outbound email message to determine if the outbound email message contains sensitive content. The processing may include first looking for sensitive content by scanning for patterns associated with sensitive content and subsequently using the neural network model 121 and possibly the Markov model 123 or rules encoded in the email management software to identify whether the outbound email message contains sensitive content. If not, the outbound mail message is forwarded over the network 105 to mail server 106 and ultimately on to the computing device 108 where the recipient may use the email client 132 to view the email message.

It should be appreciated that in some exemplary embodiments, only the neural network performs processing of the outbound email message. No scanning for patterns using regular expressions is used. In other exemplary embodiments, both of these processing approaches may be used.

Figure 2:
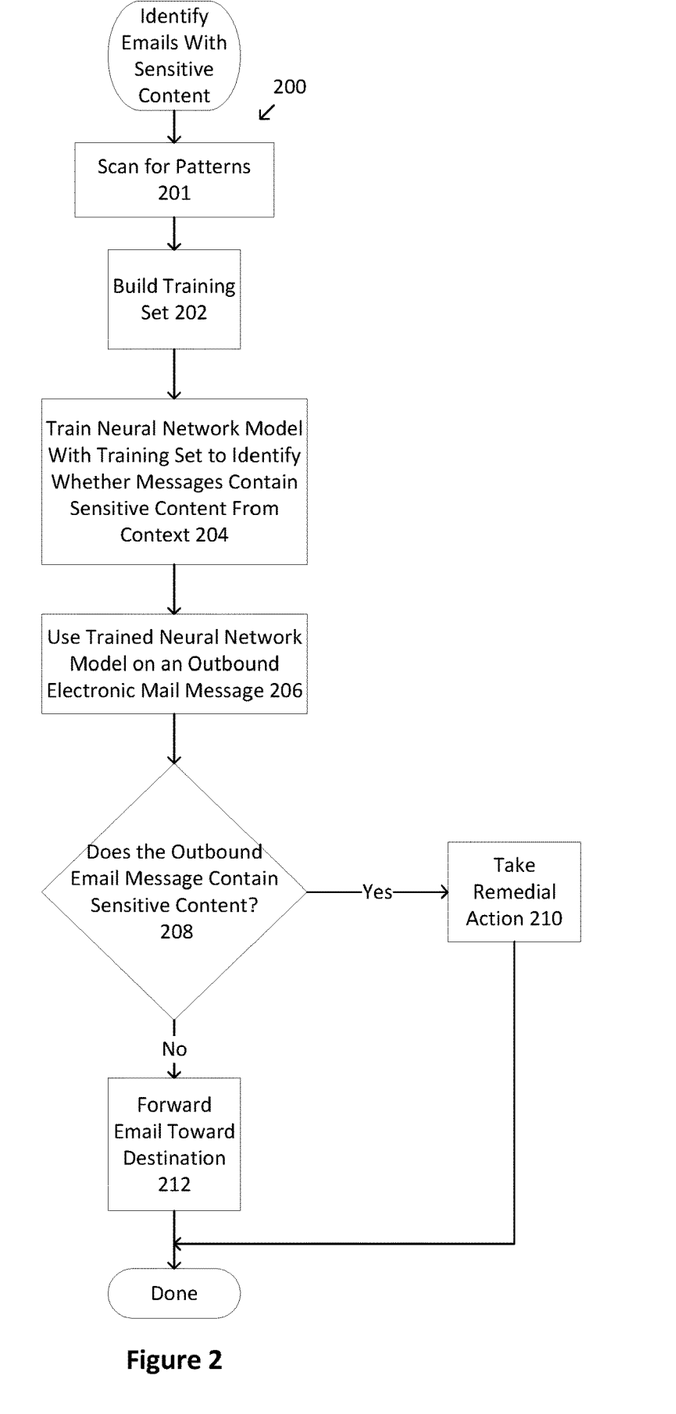
FIG. 2 depicts a flowchart of illustrative steps that may be performed by exemplary embodiments to identify email messages that contain or are likely to contain sensitive content.
Figure 3:
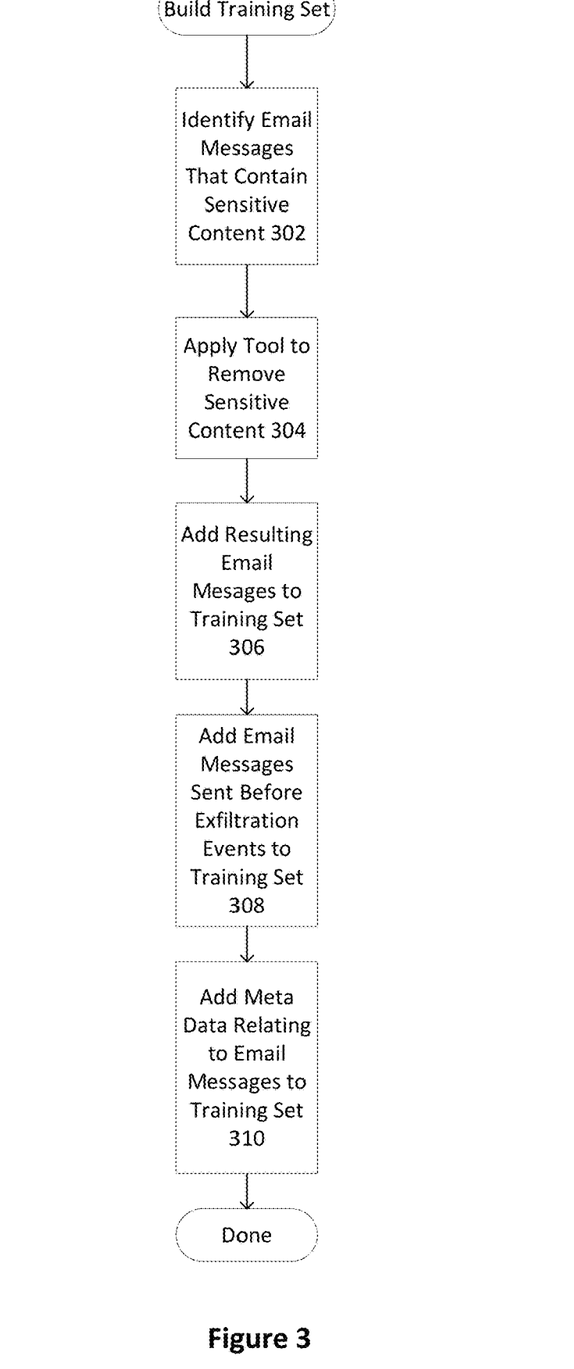
FIG. 3 depicts a flowchart of illustrative steps that may be performed by exemplary embodiments to build a training set.

FIG. 2 depicts a flowchart 200 of illustrative steps that may be performed by exemplary embodiments to process outbound emails that may contain sensitive content and avoid possible exfiltration of sensitive content by email. At 201, the outbound email message may be scanned for patterns associated with sensitive content. This may entail defining regular expressions for the patterns and scanning for the regular expressions. This step 201 may be excluded in some embodiments. The processing then shifts to prepping and using the neural network model. At 202, a training set for the neural network model is built. The training set is used to train the neural network model. FIG. 3 depicts a flowchart 300 of illustrative steps that may be performed by exemplary embodiments in building the training set. First, email messages containing sensitive content are identified at 302. These may be, for example, email messages sent that exfiltrated sensitive content from a corporation or organization. A tool may then be applied to remove the sensitive content from these email messages at 304. The resulting email messages contain their original content except for the sensitive content. The neural network model 121 may process the remainder of text in these messages to see if the text contains patterns indicative of the email messages containing sensitive subject matter. The resulting email messages are added to the training set at 306. Email messages sent before exfiltration events are also added to the training set at 308. For example, the ten email messages sent immediately before each exfiltration event may be added to the training set. These email messages may contain clues that an email message containing sensitive subject matter is about to be sent. Hence, these email messages are processed by the neural network model 121 to learn of any such content and patterns of such content. Metadata regarding email messages may also be added to the training set at 310. For example, the recipient email address, the time of day the email message was sent, number of recipients, whether the recipient is a private individual or a business are examples of metadata that may be added to the training set. The metadata may provide additional indicia of whether an email message contains sensitive data.

With reference to FIG. 2 again, at 204 the neural network model 121 is trained on the training set. The training set trains the neural network model 121 to determine whether an outbound email message contains sensitive subject matter or not. When in training mode, the neural network model 121 processes the entire training set to learn patterns in contextual information that identify that an email contains sensitive subject matter. The neural network model 121 need not directly look for sensitive subject matter but rather may make the determination based on context alone.

The neural network model may be trained on previously sent email messages with their sensitive content removed, outbound email messages sent prior to exfiltration events and metadata regarding the outbound email messages. Based on information contained in this data set, the neural network model learns patterns in the contextual information that indicate a likelihood that an outbound email message contains sensitive subject matter. For example, an outbound email message being sent late at night, an outbound email message without a subject line, an outbound email message with certain text patterns, or an outbound email message directed to an email address in a foreign country may be indicative of a higher likelihood of containing sensitive subject matter.

The training process is used to adjust the weights so that the neural network model 123 performs well on the desired data set. The training typically entails having the neural network model 123 train on a large data set so that through many iterations the neural network model 123 learns the best connection weights. For example, in the present case, the neural network model may process a large number of emails and associated metadata to learn how to identify emails that are likely to be exfiltrated.

The training may be supervised or unsupervised. With supervised training, both inputs and desired outputs for the neural network model are provided in the training set. The neural network model 123 processes the inputs of training data and compares its resulting outputs with the desired outputs. Errors are backpropagated to cause the connection weights to be adjusted, such as through the use of a delta rule as the learning rule. With unsupervised training, the inputs are provided but not the desired outputs. The neural network model 123 determines what features to use to group input data. This is often referred to as self-organization or adaptation. This approach assumes that the neural network model 123 can form their own groupings without external help. Group membership is broadly defined by input patterns sharing common features. The neural network model is able to identify those common features across a range of input patterns. Such training may be performed by competitive learning rather than by error-correction learning.

The competitive learning seeks to cause different portions of the neural network model 123 to respond similarly to certain input patterns. The neural network model has nodes organized into a grid with two dimensions. When a training input is fed to the neural network model 123, the Euclidean distance to all weight vectors is computed. The node whose weight is most similar to the input is deemed the "best matching unit" (BMU). The weights of the BMU and nodes close to it in the grid are adjusted towards the input vector. The magnitude of the change decreases with time and with the grid distance from the BMU. The update formula for a neuron v with weight vector Wv(s) may be, for example, $$Wu(s+1)=Wu(s)+\Theta(u,v,s)\cdot\alpha(s)\cdot(D(t)-Wu(s)),$$

where s is the step index, t an index into the training sample, u is the index of the BMU for the input vector D(t), $\alpha(s)$ is a monotonically decreasing learning coefficient; $\Theta(u, v, s)$ is the neighborhood function which gives the distance between the neuron u and the neuron v in step s.

Figure 4:
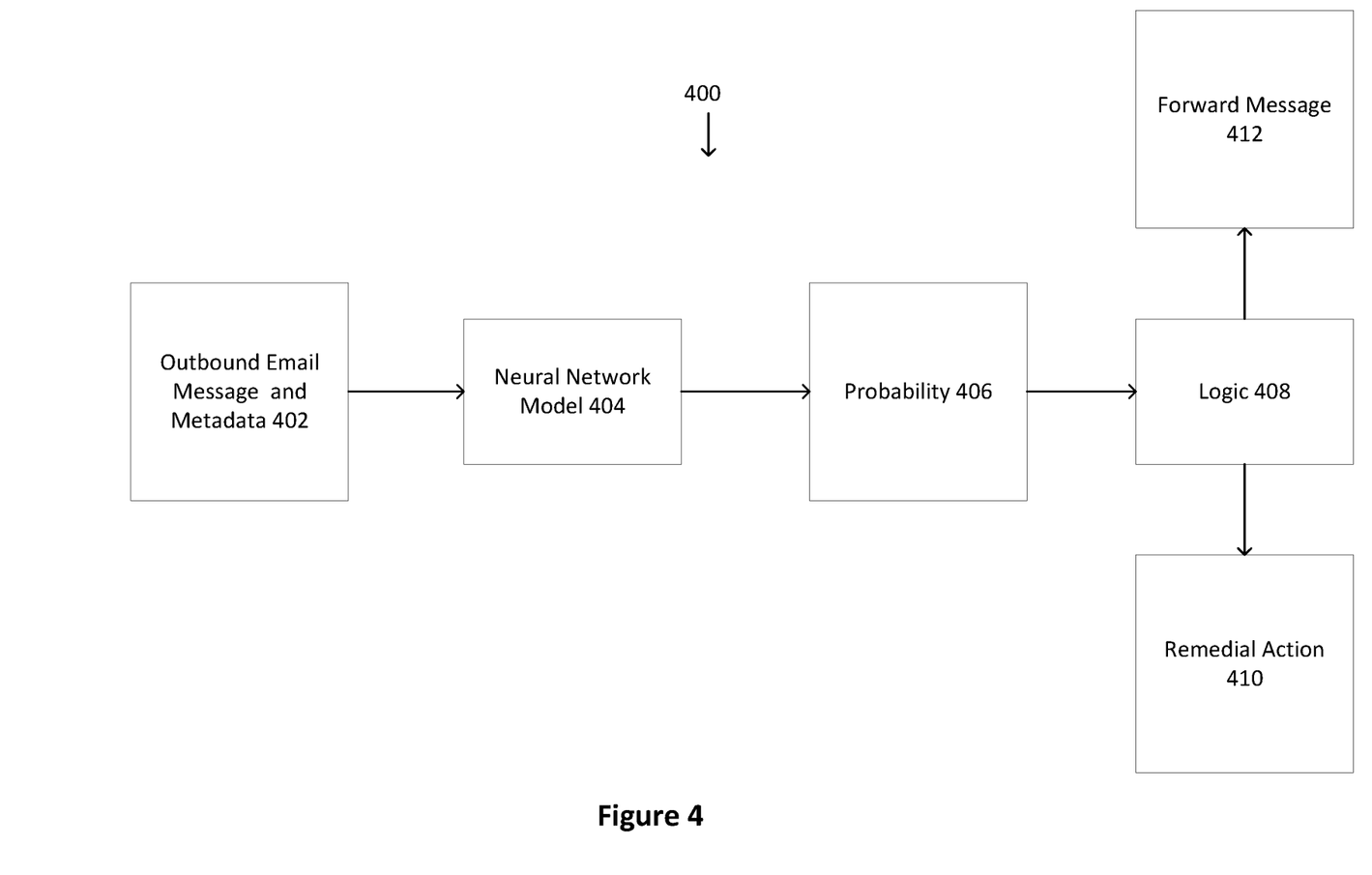
FIG. 4 depicts a block diagram illustrating the process and components entailed in processing outbound email messages by a neural network model in exemplary embodiments.

The trained neural network model 121 is then used on outbound electronic mail messages at 206. FIG. 4 depicts a block diagram 400 of use of the neural network model 404 on outbound email messages. The outbound emails and the associated metadata 402 are input to the neural network model 404. The neural network model 404 processes these inputs 402 and generates a probability 406 as an output. The probability 406 represents a confidence level that the outbound email message contains sensitive subject matter. The confidence level is based on the training and how accurate the neural network model is in predicting that a message contains sensitive subject matter given the features identified as relevant to the prediction found for the input.

Logic 408 is applied to the probability to determine what to do. The logic 408 may be implemented as computer programming instructions that are part of the email management system 120. The logic 408 may also be implemented by the Markov model 123 in some embodiments. In the simplest formulation, if the probability is over 0.5, the outbound email message is determined to contain sensitive subject matter. Otherwise, the outbound email message is determined to not contain sensitive subject matter. At 208, a determination is made whether the outbound email message contains sensitive subject matter. This determination may be based on results of the scanning and/or the probability resulting from the neural network processing. If so, remedial action 410 is taken at 210. If not, the outbound email message is forwarded 412 toward the intended recipient without remedial action at 212.

Figure 5A:
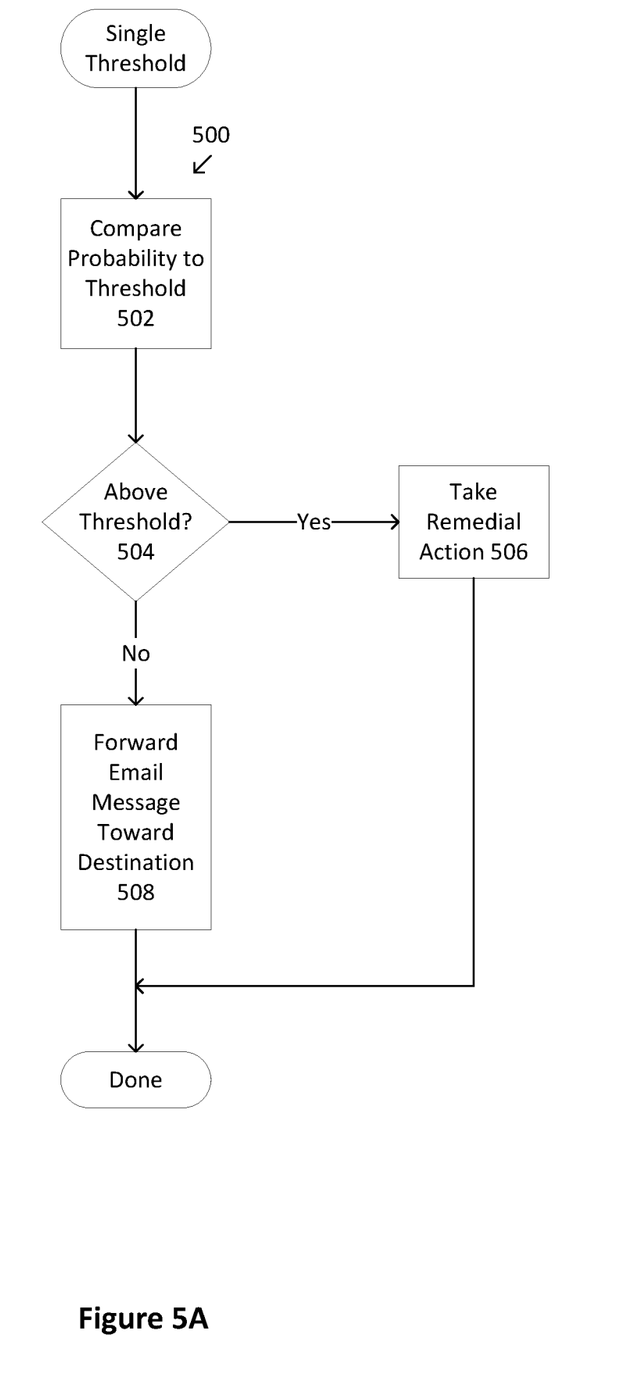
FIG. 5A depicts a flowchart of illustrative steps that may be performed by in a neural network model in exemplary embodiments to determine whether an outbound email message contains sensitive content using a single threshold.

In some exemplary embodiments, the decision of whether to take remedial action is based on a single threshold applied to the probability generated by the neural network model. In the example discussed above, the threshold was 0.5. In other examples, the threshold could be 0.8. In such single threshold cases, the steps shown in the flowchart 500 of FIG. 5A may be performed by the logic 408. At 502, the probability 406 from the neural network model 404 is compared to a threshold. A check is made at 504 if the probability 406 is above the threshold. If so, remedial action 410 is taken at 506. If not, the email is forwarded to the intended recipient 412 without remedial action at 508.

Figure 5B:
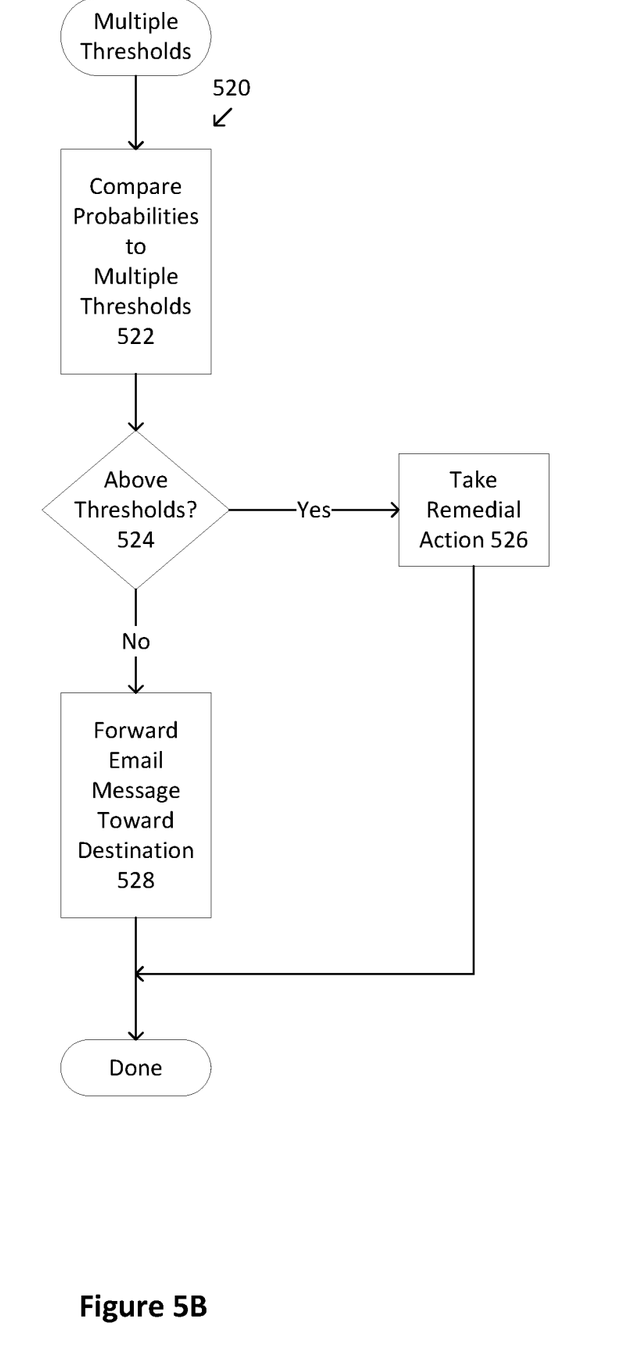
FIG. 5B depicts a flowchart of illustrative steps that may be performed by a neural network model in exemplary embodiments to determine whether an outbound email message contains sensitive content using multiple thresholds.

In some implementations, multiple thresholds may be used with the neural network model probability output to determine whether to take remedial action or not. FIG. 5B depicts a flowchart 520 of illustrative steps that may be performed in such an instance where multiple thresholds are used. Suppose, for example, that the Markov model 123 and the neural network model 123 are both used, and each produces a probability of whether an outbound email message contains sensitive subject matter. One option would be to require that both probabilities exceed respective thresholds. For instance, the neural network model probability may need to exceed 0.5, whereas the Markov model probability must exceed 0.6. In that case, the probabilities are compared to their respective thresholds at 522. A check is made whether each probability exceeds its respective threshold at 524. If so, remedial action is taken at 526. If not, no remedial action is taken, and the email message is forwarded toward its intended destination at 528.

Figure 6:
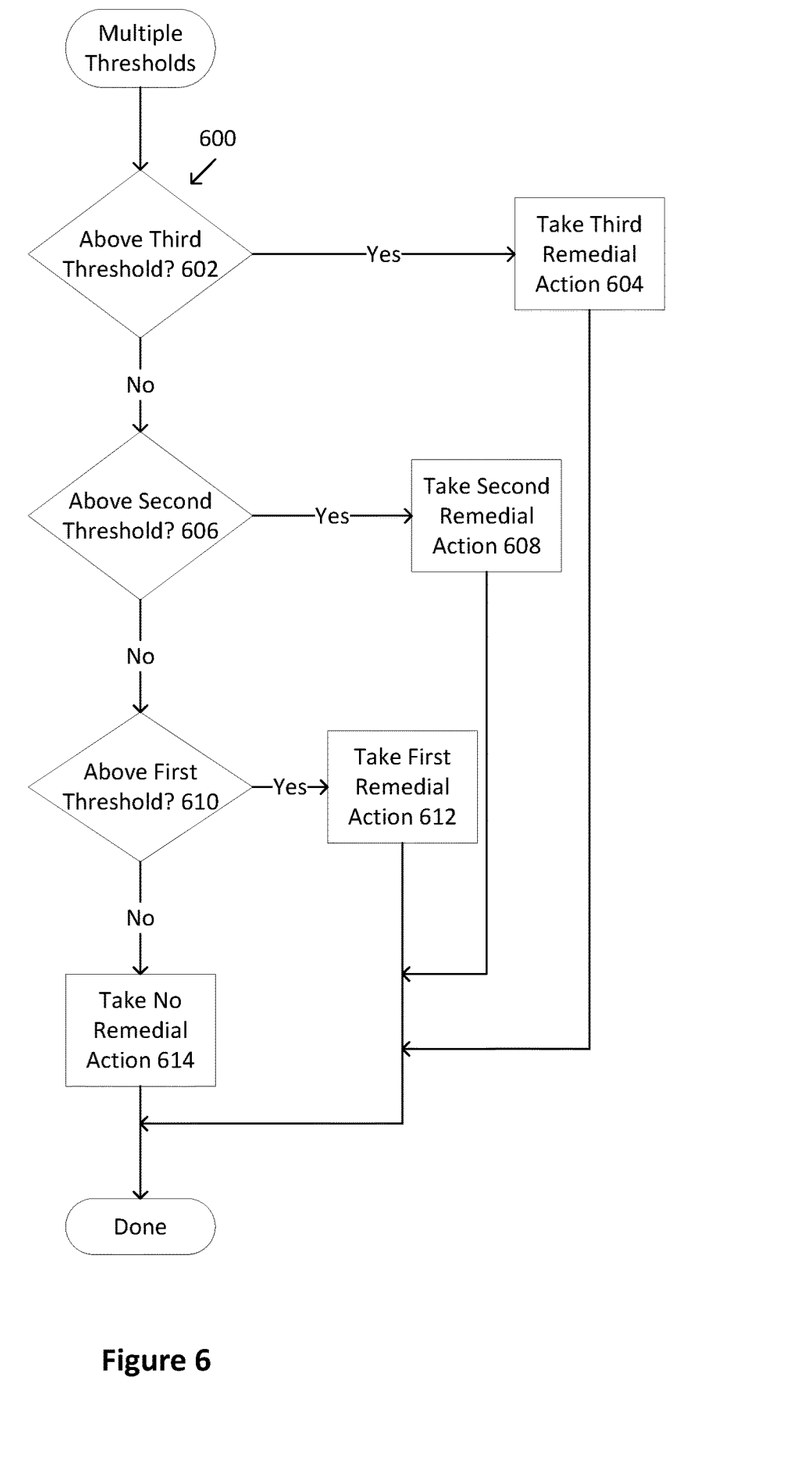
FIG. 6 depicts a flowchart of illustrative steps that may be performed by exemplary embodiments to determine what remedial action, if any, to take based on applying multiple thresholds.

Multiple thresholds may also be used with the neural network model probability output to determine which of multiple remedial actions are taken. FIG. 6 depicts a flowchart 600 of illustrative steps that may be performed in exemplary embodiments where multiple thresholds are used. At 602, a check is made whether the probability produced by the neural network model 404 exceeds a third threshold, which is a highest probability threshold (e.g., 0.9). If so, the third remedial action is taken at 604. If not, a check is made whether the probability exceeds a second threshold (e.g., 0.75) that is less than the third threshold at 606. If so, at 608 a second remedial action is taken. If not, at 610, a check is made if the probability exceeds a first threshold (e.g., 0.5). The first threshold is less than the second threshold and the third threshold. If the probability is above the first threshold, a first remedial action is taken at 612. If the probability is below the first threshold, no remedial action is taken, and the outbound electronic mail message is forwarded toward its destination at 614.

Figure 7:
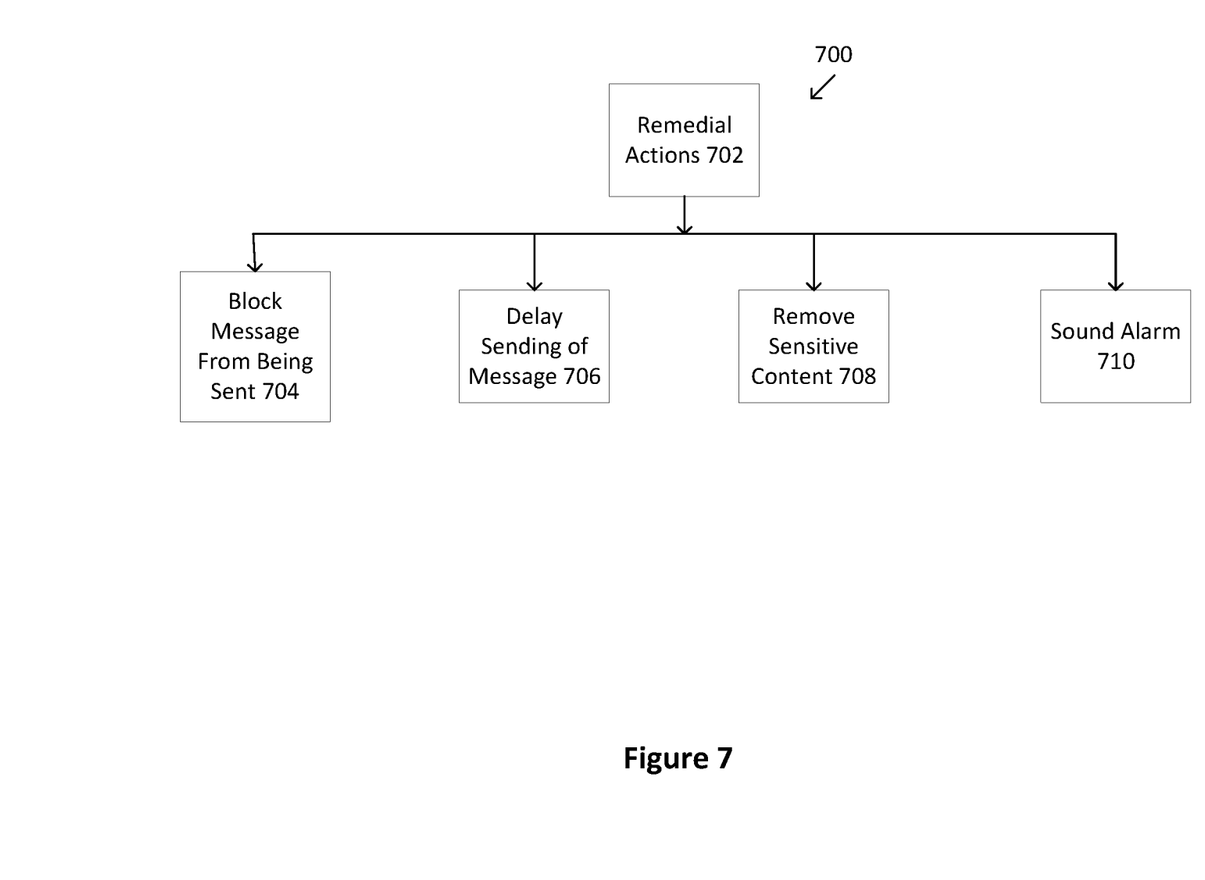
FIG. 7 depicts a diagram of illustrative remedial actions that may be taken in exemplary embodiments.

Different remedial actions may be taken in exemplary embodiments. FIG. 7 depicts a diagram 700 of different illustrative remedial actions 702. A first remedial action is to block the outbound email message from being sent 704. This remedial action 704 may be reserved for instances where there is a high confidence that the email message contains sensitive content. Another remedial action 706 is to delay the sending of the outbound email message so that it may be reviewed by a programmatic tool or a person to determine more definitively if there is sensitive content. An additional remedial action 708 is to locate and remove sensitive content from the outbound email message. Another remedial action is to sound an alarm, such as a warning flag to a network administrator, so that an appropriate response may be generated. These remedial actions 702 may be combined in some instances, such as combining sounding the alarm 710 and removing sensitive content 708. It should be appreciated that the listing of remedial actions in FIG. 7 is not intended to be exhaustive. Other remedial measures may also be employed.

Figure 8:
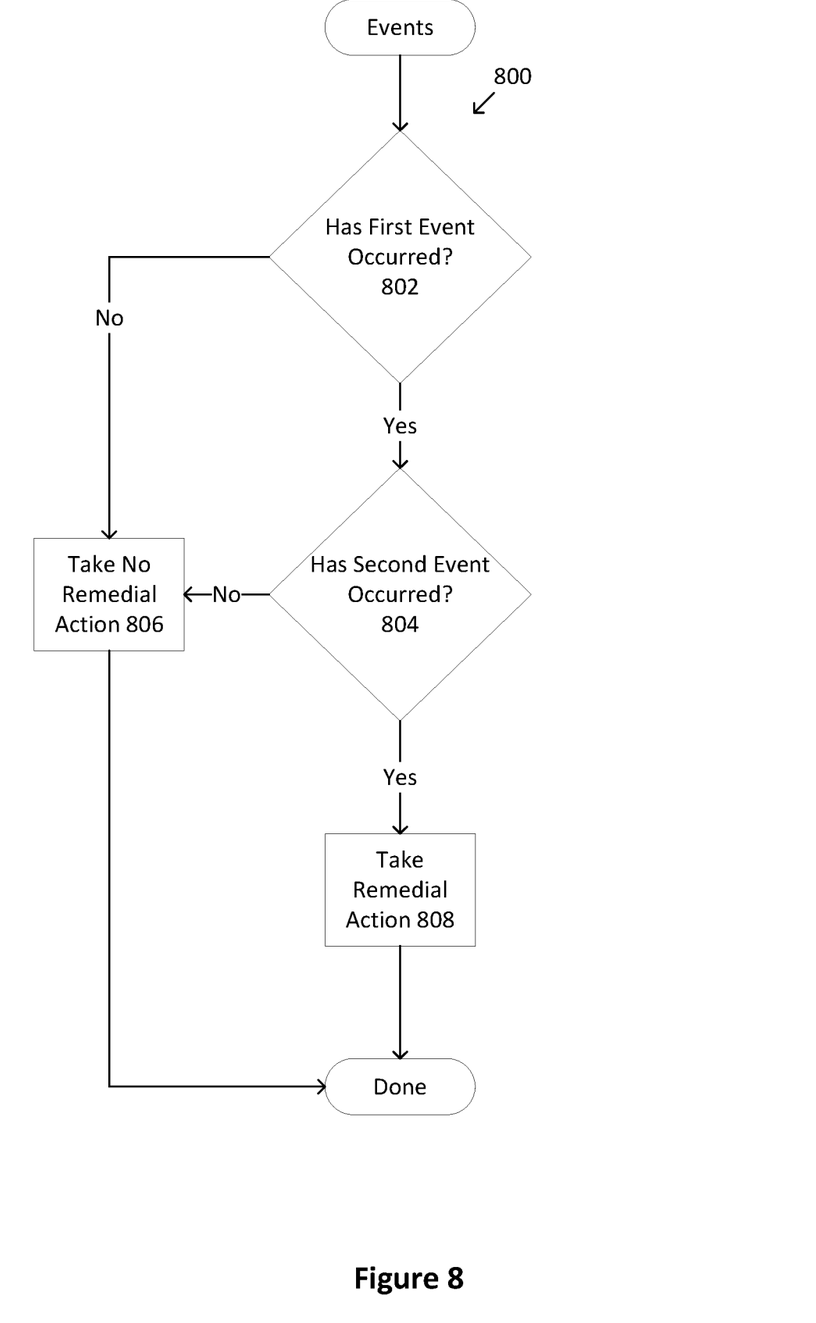
FIG. 8 depicts a flowchart of illustrative steps that may be performed when the decision whether to take remedial action is event driven.

In some exemplary embodiments, the decision as to whether to take remedial action may be event driven. For example, the decision may be event driven when a Markov model 123 is used to determine whether to take remedial action or not. FIG. 8 depicts a flowchart 800 of illustrative steps that may be performed in an exemplary case where the decision is event driven. In this exemplary case, the system checks whether a first event has occurred or not in 802. The system may use the Markov model 123 to determine whether the first event has occurred. Alternatively, logic in the email management software may make the determination. The event may be something simple, such as the probability produced by the neural network model 121 for an email is above 0.75. If it is determined that such an event has not occurred, no remedial action is taken at 806. However, if the event occurs, the system checks whether a second event has occurred at 804. For example, a check may be made whether there has been a database dump to a computer or not. If the second event has occurred, remedial action is taken at 808. Otherwise, no remedial action is taken at 806.

While exemplary embodiments have been described herein, various changes in form and detail relative to the exemplary embodiments may be made without departing from the intended scope of the appended claims.

The invention claimed is:

1. A method performed by one or more computing resources, comprising:
   with the one or more computing resources, scanning an outbound electronic mail message for patterns associated with sensitive content;
   further processing the outbound electronic mail message with a neural network model running on the one or more computing resources and trained to yield a probability that the outbound electronic mail message contains sensitive content based on contextual information relating to the outbound electronic mail message, wherein:
      the neural network model is trained, at least in part, using a training set comprising at least one training electronic mail message consisting of non-sensitive text of at least one sensitive mail message that exfiltrated at least one item of sensitive content, the non-sensitive text comprising text of the at least one sensitive mail message with an entirety of the at least one item of sensitive content removed to determine whether the non-sensitive text contains patterns indicative of containing sensitive content; and
      the training set includes a specified number of electronic mail messages that were sent immediately before an exfiltration event; and
   taking, responsive to the scanning locating one or more patterns associated with sensitive content or the probability that the outbound electronic mail message contains sensitive content exceeding a first threshold, a first remedial action regarding the outbound electronic mail message.

2. The method of claim 1, wherein the neural network model, running on the one or more computing resources, is trained on the training set of electronic mail messages to identify probabilities that the electronic mail messages contain sensitive content based on contextual information in the training set without searching for the sensitive content in the electronic mail messages, wherein the contextual information comprises a time of the electronic mail messages.

3. The method of claim 2, wherein the training set includes metadata regarding at least some of the electronic mail messages in the training set and wherein metadata regarding the outbound electronic mail message is processed to yield the probability that the outbound electronic mail message contains sensitive content.

4. The method of claim 1, wherein the first remedial action includes delaying the sending of the outbound electronic mail message for review and removing the sensitive content from the outbound electronic mail message before the outbound electronic mail message is sent after the sensitive content is removed.

5. The method of claim 1, further comprising where the probability that the outbound electronic mail message contains sensitive content exceeds a second threshold that is larger than the first threshold, taking a second remedial action regarding the outbound electronic mail message rather than the first remedial action.

6. The method of claim 5, further comprising using a Markov model in conjunction with the neural network model to determine if the outbound electronic mail message contains sensitive content.

7. A method performed by a processor on a computing device, comprising:
   receiving an outbound electronic mail message at an electronic mail management system;
   processing the outbound electronic mail message with the processor by scanning the outbound electronic mail message for patterns associated with sensitive content;
   further processing the outbound electronic mail message with a neural network model running on the processor to determine if the outbound electronic mail message contains sensitive content, wherein:
      the neural network model is trained, at least in part, using a training set comprising at least one training electronic mail message consisting of non-sensitive text of at least one sensitive mail message that exfiltrated at least one item of sensitive content, the non-sensitive text comprising text of the at least one sensitive mail message with an entirety of the at least one item of sensitive content removed to determine whether the non-sensitive text contains patterns indicative of containing sensitive content; and
      the training set includes a specified number of electronic mail messages that were sent immediately before an exfiltration event;

taking, responsive to determining that the outbound electronic mail message contains sensitive content, remedial action on the outbound electronic mail message; and forwarding, responsive to determining that the outbound electronic mail message does not contain sensitive content, the outbound electronic mail message towards its destination.

8. The method of claim 7, wherein the further processing the outbound electronic mail message with the neural network model running on the processor to determine if the outbound electronic mail message contains sensitive content comprises examining context associated with the outbound electronic mail message to determine whether the outbound electronic mail message contains sensitive content, wherein the context comprises at least one of a time of the electronic mail messages.

9. The method of claim 8, wherein the further processing of the outbound electronic mail message with the neural network model running on the processor to determine if the outbound electronic mail message contains sensitive content is performed without examining the outbound electronic mail message for sensitive content.

10. The method of claim 7, wherein the remedial action comprises delaying the sending of the outbound electronic mail message for review, and removing the sensitive content from the outbound electronic mail message before the outbound electronic mail message is sent after the sensitive content is removed.

11. The method of claim 7, wherein a Markov model is used in conjunction with the neural network in determining whether the outbound electronic mail message contains sensitive content.

12. The method of claim 7, wherein the remedial action taken is based upon a probability that the outbound electronic mail message contains sensitive content.

13. The method of claim 12, wherein:
a first action is taken as the remedial action when the probability that the outbound electronic mail message contains sensitive content is above a first threshold; and
a second action is taken as the remedial action when the probability that the outbound electronic mail message contains sensitive content is above a second threshold.

14. The method of claim 7, wherein the processing of the outbound electronic mail message with a neural network model to determine if the outbound electronic mail message contains sensitive content comprises processing metadata regarding the outbound electronic mail message.

15. A non-transitory computer-readable storage medium for storing processor-executable instructions for execution by a processor of a computing device to perform the following:

receive an outbound electronic mail message at an electronic mail management system or at a proxy;

process the outbound electronic mail message with a neural network model to determine if the outbound electronic mail message contain sensitive content, wherein:
the neural network model is trained, at least in part, using a training set comprising at least one training electronic mail message consisting of non-sensitive text of at least one sensitive mail message that exfiltrated at least one item of sensitive content, the non-sensitive text comprising text of the at least one sensitive mail message with an entirety of the at least one item of sensitive content removed to determine whether the non-sensitive text contains patterns indicative of containing sensitive content; and
the training set includes a specified number of electronic mail messages that were sent immediately before an exfiltration event;

take, responsive to determining that the outbound electronic mail message contains sensitive content, remedial action on the outbound electronic mail message; and forward, responsive to determining that the outbound electronic mail message does not contain sensitive content, the outbound electronic mail message towards its destination.

16. The non-transitory computer-readable storage medium of claim 15, wherein a Markov model is used to determine what the remedial action is.

17. The non-transitory computer-readable storage medium of claim 16, wherein the remedial action is based on a magnitude of a probability that the outbound electronic mail message contains sensitive content and the remedial action includes delaying the sending of the outbound electronic mail message for review and removing the sensitive content from the outbound electronic mail message before the outbound electronic mail message is sent after the sensitive content is removed.

18. The non-transitory computer-readable storage medium of claim 15, wherein the determining of whether the outbound electronic mail message contains sensitive content is performed without examining text of the outbound electronic mail message for sensitive content by examining context associated with the outbound electronic mail message, wherein the context comprises at least one of a time of the electronic mail messages.

19. The method of claim 1, wherein a Markov model is configured to receive the probability determined via the neural network model as input and to determine a response to the outbound electronic mail message based on the probability determined via the neural network model.

* * * * *